(12) United States Patent
Tison et al.

(10) Patent No.: US 10,443,955 B2
(45) Date of Patent: Oct. 15, 2019

(54) TUBE WITH A RESERVOIR OF PHASE-CHANGE MATERIAL FOR A HEAT EXCHANGER

(71) Applicant: Valeo Systemes Thermiques, Le Mesnil Saint Denis (FR)

(72) Inventors: Frédéric Tison, Guecelard (FR); Sylvain Moreau, Spay (FR); Lionel Robillon, Mulsanne (FR); Aurélie Bellenfant, Roeze-sur-Sarthe (FR); François Busson, Saint-Gervais-en-Belin (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 0 days.

(21) Appl. No.: 15/509,514

(22) PCT Filed: Sep. 8, 2015

(86) PCT No.: PCT/EP2015/070524
§ 371 (c)(1),
(2) Date: Mar. 8, 2017

(87) PCT Pub. No.: WO2016/038053
PCT Pub. Date: Mar. 17, 2016

(65) Prior Publication Data
US 2017/0261269 A1    Sep. 14, 2017

(30) Foreign Application Priority Data

Sep. 8, 2014  (FR) ...................................... 14 58387

(51) Int. Cl.
*F28D 20/02*  (2006.01)
*F28F 3/04*  (2006.01)
(Continued)

(52) U.S. Cl.
CPC ........... *F28D 20/02* (2013.01); *F28D 1/0308* (2013.01); *F28D 1/0341* (2013.01); *F28F 3/044* (2013.01);
(Continued)

(58) Field of Classification Search
CPC ........ F28F 3/00; F28F 3/02; F28F 3/04; F28F 3/042; F28F 3/044; F28D 1/03;
(Continued)

(56) References Cited

U.S. PATENT DOCUMENTS 3,757,857 A * 9/1973 Merryfull .............. B21D 53/08
165/170
3,783,090 A * 1/1974 Anderson ................. F28F 3/04
165/166

(Continued)

FOREIGN PATENT DOCUMENTS

| WO | 2014/024375 A1 | 2/2014 |
| WO | 2014/095577 A1 | 6/2014 |
| WO | 2014/103563 A1 | 7/2014 |

OTHER PUBLICATIONS

International Search Report issued in corresponding application No. PCT/EP2015/070524 dated Nov. 19, 2015 (4 pages).
(Continued)

*Primary Examiner* — Keith M Raymond
*Assistant Examiner* — Gustavo A Hincapie Serna
(74) *Attorney, Agent, or Firm* — Osha Liang LLP

(57) ABSTRACT

The present invention relates to a tube (1) with a reservoir of phase-change material for a heat exchange bundle (100) of a heat exchanger, said tube (1) with a reservoir of phase-change material including:
  two flow plates (3) which are configured to be assembled with one another in a fluid-tight fashion and form at least one duct (31) in which a first heat-transfer fluid flows between said flow plates (3),
  (Continued)

Figure 1:
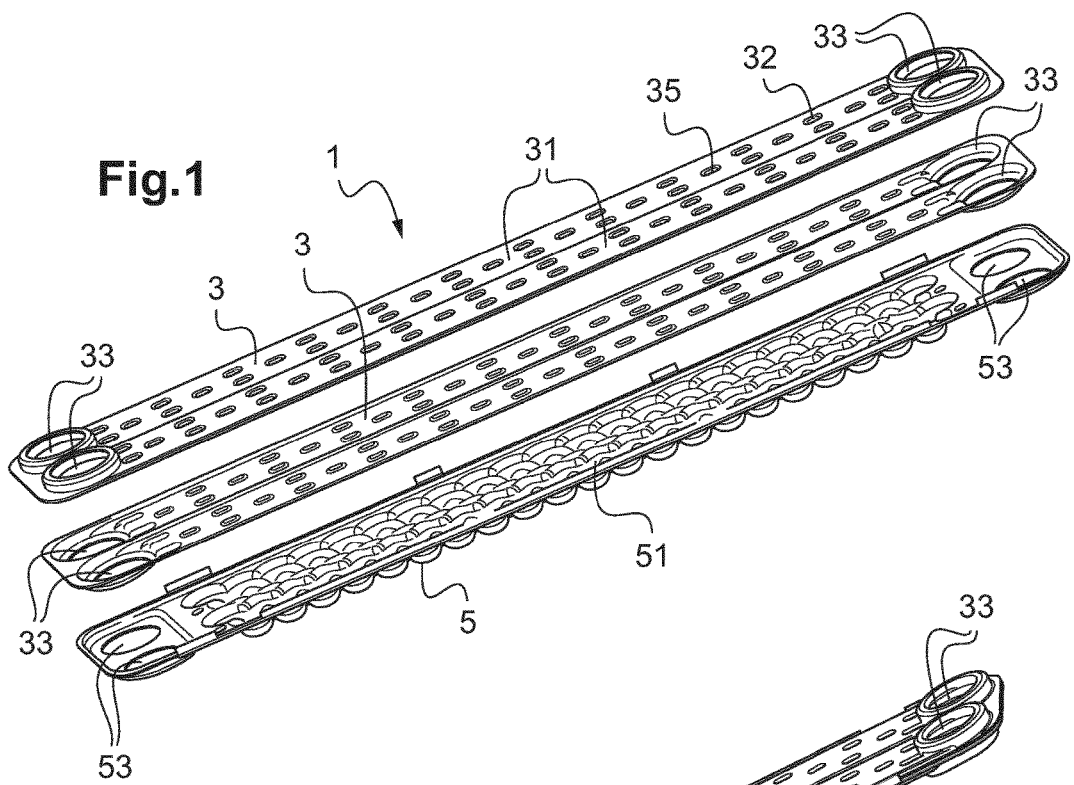

at least one reservoir plate (5) including cavities (51), said reservoir plate (5) being configured so that it can be assembled in fluid-tight fashion on an external face of one of the two flow plates (3) so as to close the cavities (51) and form housings for the phase-change material, said cavities (51) projecting from the external face of the reservoir plate (5) so that that a second heat-transfer fluid can circulate between said cavities (51).

9 Claims, 3 Drawing Sheets

(51) Int. Cl.
    *F28D 1/03*     (2006.01)
    *F28D 20/00*     (2006.01)
    *F28D 21/00*     (2006.01)

(52) U.S. Cl.
    CPC .............. *F28D 2020/0013* (2013.01); *F28D 2021/0085* (2013.01); *F28D 2021/0094* (2013.01); *F28D 2021/0096* (2013.01); *Y02E 60/145* (2013.01)

(58) Field of Classification Search
    CPC .... F28D 1/0308; F28D 1/0316; F28D 1/0325; F28D 1/0333; F28D 9/0031; F28D 9/0037; F28D 9/0062; F28D 17/00; F28D 20/02; F28D 20/0034; F28D 2020/0013; F28D 2021/0085; F28D 2021/0094; F28D 2021/0096; Y02E 60/145
    USPC .......................................... 165/10, 153, 170
    See application file for complete search history.

(56) References Cited

U.S. PATENT DOCUMENTS

| | | | | |
|---|---|---|---|---|
| 4,124,018 | A * | 11/1978 | Murray | F28F 3/14 126/585 |
| 4,846,268 | A * | 7/1989 | Beldam | B21D 53/02 165/153 |
| 5,996,633 | A * | 12/1999 | Kato | F28D 1/0316 138/116 |
| 8,122,943 | B2 * | 2/2012 | Haller | F28D 1/0535 165/10 |
| 8,464,550 | B2 * | 6/2013 | Kerler | B60H 1/005 165/10 |
| 8,935,936 | B2 * | 1/2015 | Karl | F25B 39/022 62/243 |
| 8,973,395 | B2 * | 3/2015 | Yamada | F25D 19/00 62/524 |
| 9,074,799 | B2 * | 7/2015 | Abei | F25B 39/04 |
| 9,150,081 | B2 * | 10/2015 | Vreeland | B60H 1/005 |
| 9,719,732 | B2 * | 8/2017 | Ota | F28D 20/02 |
| 9,927,160 | B2 * | 3/2018 | Haseba | F25B 39/02 |
| 2010/0307180 | A1 * | 12/2010 | Yamada | F28D 1/0333 62/285 |
| 2011/0011568 | A1 * | 1/2011 | Han | F28D 9/0043 165/133 |
| 2013/0047663 | A1 * | 2/2013 | Kamoshida | F25B 39/02 62/524 |
| 2015/0198383 | A1 * | 7/2015 | Kitoh | F28D 20/02 165/10 |

OTHER PUBLICATIONS

Written Opinion of the International Searching Authority issued in corresponding application No. PCT/EP2015/070524 dated Nov. 19, 2015 (5 pages).

* cited by examiner

TUBE WITH A RESERVOIR OF PHASE-CHANGE MATERIAL FOR A HEAT EXCHANGER

The present invention relates to a tube with a reservoir of phase-change material for a heat exchange bundle of a heat exchanger, notably in the field of heat control in a motor vehicle.

Heat exchangers generally include a bundle of parallel tubes formed of plates containing a first heat-transfer fluid, for example a coolant fluid in the case of an air-conditioning circuit evaporator. A second heat-transfer fluid also passes through the bundle, for example a flow of air intended for the passenger compartment, sweeping over the tubes the surface area of which, increased by adding disturbing or intermediate elements between the tubes, optimizes the exchange of heat.

It is known to provide these heat exchangers with reservoirs of phase-change material associated with the tubes of the bundle used to circulate the first heat-transfer fluid. In the case of an evaporator of an air-conditioning circuit, for example, exchanges of this kind make it possible to maintain the cooling of a passenger compartment of the vehicle for a given time period, notably when the engine of the vehicle is stopped and is longer driving the compressor that circulates the coolant fluid, notably in vehicles provided with a system for automatically stopping the engine during short stops of the vehicle. In these periods with the engine stopped, the phase-change material captures heat energy from the air passing through the evaporator so as to cool it.

Thus there is known in particular a vehicle air-conditioning circuit evaporator including a heat exchange bundle including a set of tubes for circulating the coolant fluid, a reservoir storing phase-change material being in contact with the tubes and an air passage being provided between the tubes and the cold storage reservoirs, notably by protrusions and recesses formed between the latter. In exchangers of this kind the transfer of heat between the tubes in which the coolant fluid circulates and the reservoirs of phase-change material is reduced on the one hand by the existence of said protrusions and recesses extending over a large area of each of the tubes and on the other hand by the thickness of material involved in the transfer of heat from the tube to the reservoir. In fact, the latter thickness comprises the wall of the tube and the wall of the reservoir.

One object of the present invention is at least partly to remedy the drawbacks of the prior art and to propose a tube with a reservoir of phase-change material that is improved for more effective use in a heat exchange bundle of a heat exchanger.

The present invention therefore relates to a tube with a reservoir of phase-change material for a heat exchange bundle of a heat exchanger, said tube with a reservoir of phase-change material including:
- two flow plates which are configured to be assembled with one another in a fluid-tight fashion and form at least one duct in which a first heat-transfer fluid flows between said flow plates,
- at least one reservoir plate including cavities, said reservoir plate being configured so that it can be assembled in fluid-tight fashion on an external face of one of the two flow plates so as to close the cavities and form housings for the phase-change material, said cavities projecting from the external face of the reservoir plate so that that a second heat-transfer fluid can circulate between said cavities.

Accordingly, only a few different types of plates are used to produce the tube with a reservoir of phase-change material, namely two circulation plates and at least one reservoir plate. This makes it possible to limit manufacture to these two types of plates which makes possible savings in production costs. Moreover, this reduced number of types of plates simplifies assembly.

An additional advantage of the tube with a reservoir of phase-change material is that the phase-change material is directly in contact with the circulation plate, which facilitates and improves the exchanges of heat energy between the first heat-transfer fluid and the phase-change material.

According to one aspect of the invention, the tube with a reservoir of phase-change material it includes a single reservoir plate on one of its external faces in contact with the second heat-transfer fluid.

According to another aspect of the invention, the tube includes a reservoir plate with a reservoir of phase-change material on each of its external faces in contact with the second heat-transfer fluid.

According to another aspect of the invention, the tube with a reservoir of phase-change material includes a common orifice for filling the projecting cavities of the two reservoir plates.

According to another aspect of the invention, the projecting cavities are domed-shaped.

According to another aspect of the invention, the projecting cavities have a "V" distribution about the longitudinal axis of the reservoir plate.

According to another aspect of the invention, the top of the projecting cavities is flat in order to come into contact with an exchange tube facing it in the heat exchange bundle.

According to another aspect of the invention, the circulation plates are identical.

According to another aspect of the invention, at least one of the circulation plates includes hollows for storing phase-change material.

According to another aspect of the invention, each hollow is in contact with the other circulation plate.

According to another aspect of the invention, the hollows are arranged in a quincunx.

The present invention also relates to a heat exchange bundle for a heat exchanger, including at least one tube with a reservoir of phase-change material as described above.

The present invention also relates to a heat exchanger including at least one heat exchange bundle as described above.

Figure 2:
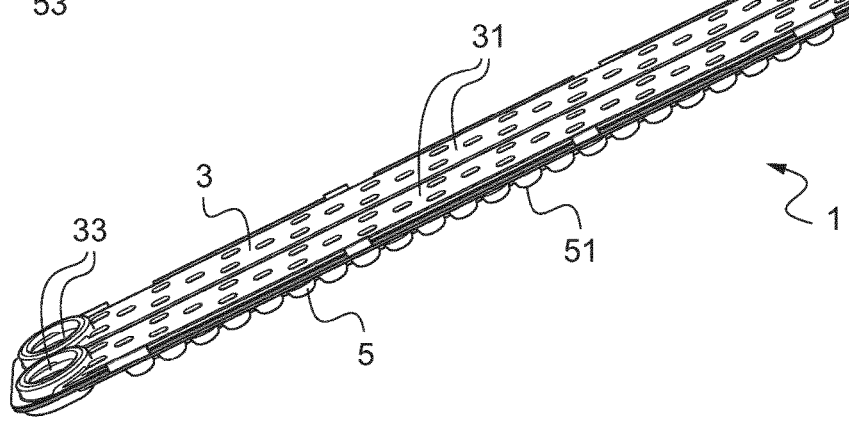
Figure 3:
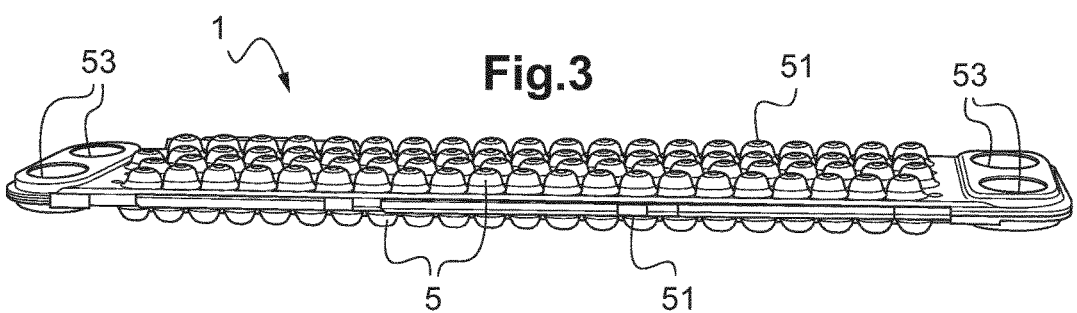
Figure 4:
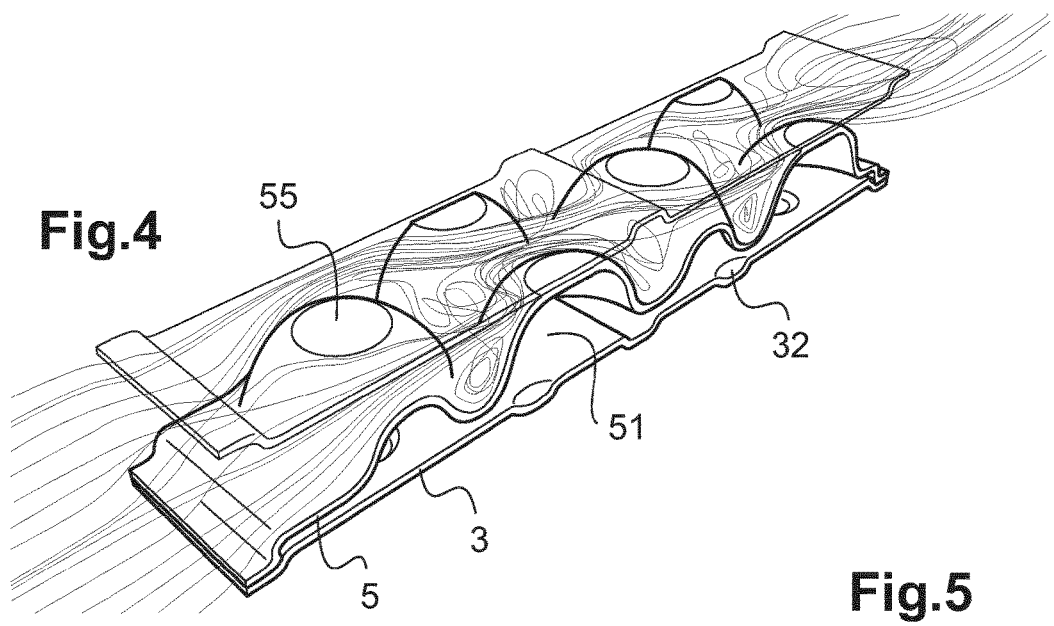
Figure 5:
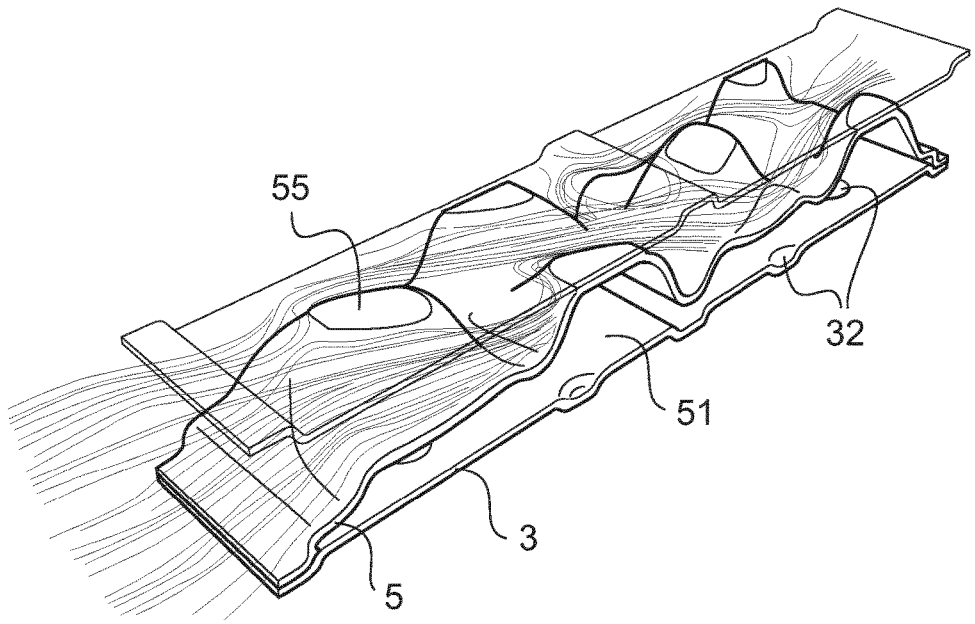
Figure 6:
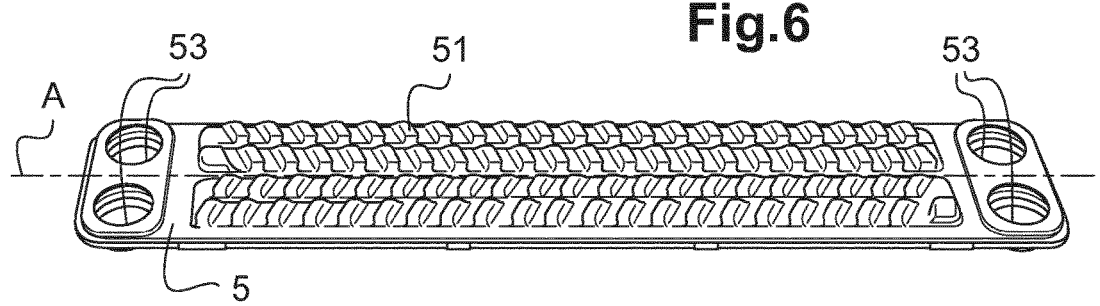
Figure 7:
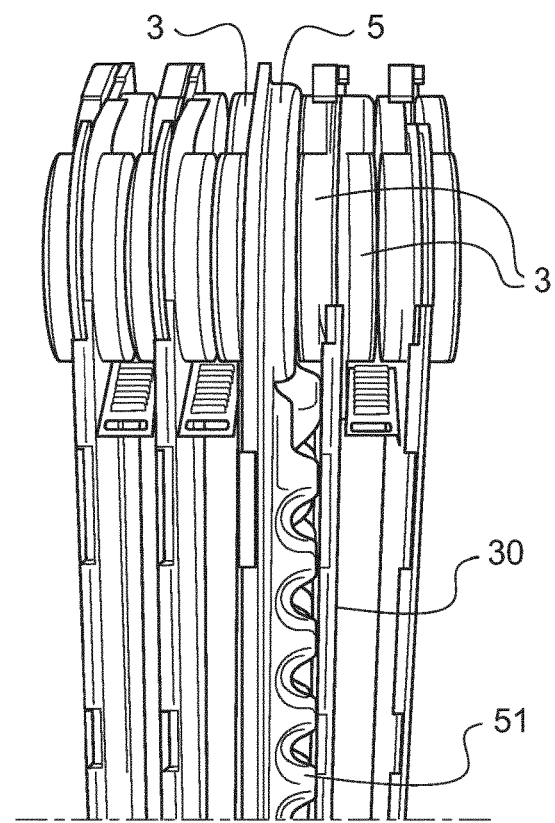
Figure 8:
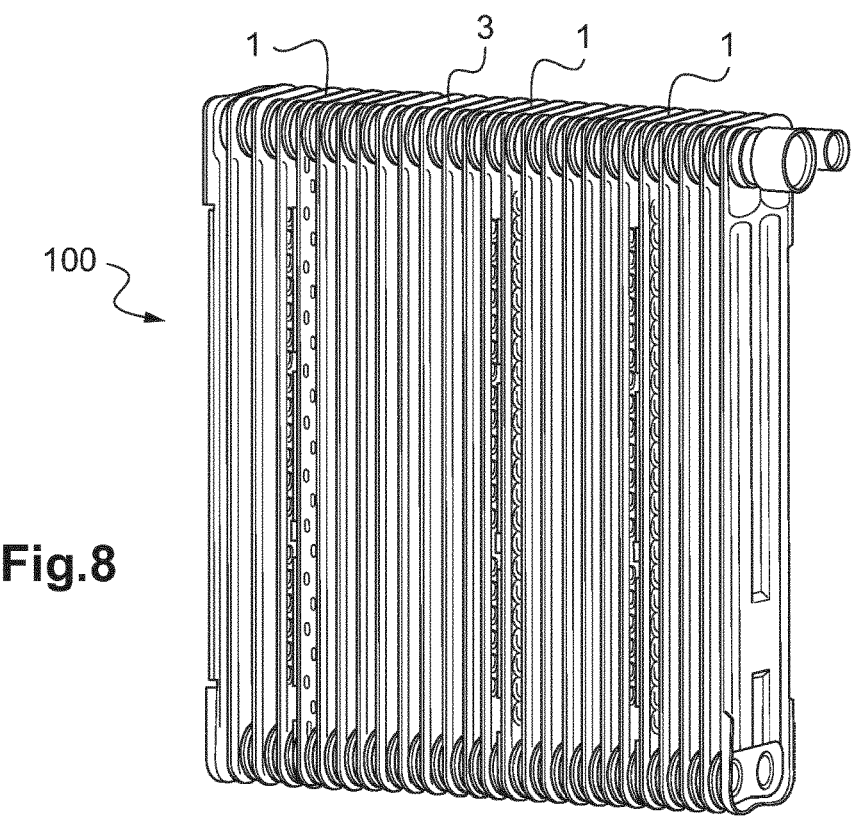

Other features and advantages of the invention will become more clearly apparent on reading the following description given by way of nonlimiting illustrative example and from the appended drawings in which:

FIG. 1 is a diagrammatic exploded perspective view of a tube with a reservoir of phase-change material, FIG. 2 is a diagrammatic perspective view of the tube with a reservoir of phase-change material from FIG. 1 when assembled, FIG. 3 is a diagrammatic perspective view of a tube with a reservoir of phase-change material according to one particular embodiment, FIG. 4 is a diagrammatic sectional view of a portion of a tube with a reservoir of phase-change material, FIG. 5 is a diagrammatic sectional view of a portion of a tube with a reservoir of phase-change material according to another embodiment, FIG. 6 is a diagrammatic perspective view of a tube with a reservoir of phase-change material according to the FIG. 5 embodiment, FIG. 7 is a diagrammatic perspective view of an assembly of tubes in a heat exchange bundle, FIG. 8 is a diagrammatic representation of a heat exchanger bundle.

In the various figures, identical elements bear the same reference numbers.

As FIG. 1 shows, the tube 1 with a reservoir of phase-change material includes two circulation plates 3 and at least one reservoir plate 5.

The two circulation plates 3 are configured to be assembled to one another in a fluid-tight manner and to form at least one duct 31 in which a first heat-transfer fluid circulates between said circulation plates 3. The two circulation plates 3 are preferably identical and disposed relative to one another in a "mirror" configuration, which makes it possible to produce only one type of circulation plate 3 and therefore makes it possible to achieve savings in production.

For its part the at least one reservoir plate 5 for its part includes cavities 51 and is configured to be assembled in a fluid-tight manner to an external face of one of the two circulation plates 3 so as to close the cavities 51 and form housings for the phase-change material. These cavities 51 project on the external face of the reservoir plate 5 so that a second heat-transfer fluid, for example a flow of air, can circulate between said cavities 51.

Only two different types of plates are used to produce the tube 1 with a reservoir of phase-change material, namely two circulation plates 3 and at least one reservoir plate 5. A design of this kind makes it possible to limit the production of a reservoir tube of this kind to these two types of plates, consequently generating savings in production costs. Moreover, assembly is simplified by this small number of types of plates.

An additional advantage of the tube 1 with a reservoir of phase-change material is that the phase-change material is directly in contact with the circulation plate 3, which facilitates and improves the exchanges of heat energy between the first heat-transfer fluid and the phase-change material.

As FIGS. 1, 4 and 5 show, the circulation plates 3 can also include hollows 32 preferably produced by drawing and with a homogeneous distribution over the whole of the circulation plate 3. The circulation plates 3 have an external face intended to be oriented toward either the reservoir plate 5 or an element for exchanging heat with the second heat transfer fluid, such as a corrugated plate. Each circulation plate 3 has an internal face opposite the external face and from which each hollow 32 extends so that its top part is in contact with the adjacent circulation plate 3. According to one preferred but nonlimiting embodiment the hollows 32 are distributed on the circulation plate 3 in a quincunx. Because of a distribution of this kind, the interior face of each hollow 32 is in the flow path of the first fluid delimited by the duct 31 while the exterior face can form a local reserve of phase-change material, thereby improving the thermal exchange therewith.

Because the external face of the circulation plate 3 includes hollows 32, the latter form complementary reserves of phase-change material so that, for a given overall size, a tube with a reservoir 5 of phase-change material including hollows 32 of this kind enables storage of a greater quantity of phase-change material. The effect of this is to increase the time for which the phase-change material exchanges heat energy with the second fluid.

Moreover, given that the hollows 32 form additional connections with the adjacent circulation plate 3, the mechanical strength of the tube 1 with a reservoir of phase-change material is increased. Consequently a tube 1 of this kind with a phase-change material reservoir may be used in a heat exchanger of the type of an evaporator that is adapted to receive a coolant fluid the pressure of which has a nominal value of approximately 15 bar.

As FIG. 2 shows, the tube 1 with a reservoir of phase-change material includes a single reservoir plate 5 on one of its external faces in contact with the second heat-transfer fluid. The other of its faces is in contact with a corrugated plate for exchange of heat with the second heat-transfer fluid, a corrugated plate of this kind sometimes being referred to as a separator or finned.

According to a variant embodiment, the tube 1 can nevertheless include a reservoir plate 1 with a reservoir of phase-change material on each of its external faces in contact with the second heat-transfer fluid as shown in FIG. 3. In order to facilitate the filling of the projecting cavities 51 in this embodiment, the tube 1 with a reservoir of phase-change material can include a filler orifice (not shown) common to the projecting cavities 51 of the two reservoir plates 5.

According to a first embodiment shown in FIG. 4, the projecting cavities 51 are dome-shaped. These domes are more particularly disposed in a quincunx so that the second heat-transfer fluid can circulate between them.

According to a second embodiment shown in FIG. 5, the projecting cavities 51 have an oblong shape. The projecting cavities 51 are then distributed in a "V" configuration with respect to the longitudinal axis A of the reservoir plate 5 as FIG. 6 shows. This shape and this particular distribution enable a tube 1 with a reservoir of phase-change material to contain a greater quantity of phase-change material than the dome shape and also make it possible to limit the heat losses of the second heat-transfer fluid when it passes between the projecting cavities 51.

In either the first or second embodiment the projecting cavities 51 have a flat top 55 of cylindrical and polygonal, for example approximately trapezoidal, section.

Tops 55 of this kind are intended to come into contact with a facing exchange tube 30 inside the heat exchange bundle 100 as shown in FIG. 7.

The exchange tube 30 may be a tube including microchannels, a tube of this kind being obtained by the superposition of plane plates and a corrugated plate, the latter sometimes being termed an internal separator, said corrugated plate then being disposed between the two adjacent plane plates to form the microchannels.

According to a variant embodiment, the exchange tubes 30 can more particularly consist of two circulation plates 3 as described above assembled to one another in a fluid-tight manner.

FIG. 8 shows a heat exchange bundle 100 including tubes 1 with a reservoir of phase-change material in order in the end to form a heat exchanger. Here the heat exchange bundle 100 includes three tubes 1 with a reservoir of phase-change material distributed over its entire length. Two of these tubes 1 with a reservoir of phase-change material include a reservoir plate 5 on each of their external faces in contact with the second heat-transfer fluid. For its part the third tube 1 with a reservoir of phase-change material includes only one reservoir plate 5 on one of its external faces in contact with the second heat-transfer fluid. The total number of tubes 1 with a reservoir of phase-change material and reservoir plates 5 present in a heat exchange bundle 100 is a function of its size and its length. The longer the heat exchange bundle 100, the greater this number in order to cool the second heat-transfer fluid continuously even if the first heat-transfer fluid is no longer circulating in said bundle, for example if the compressor is stopped.

It is therefore clear that because it consists of two circulation plates 3 and at least one reservoir plate 5 the tube 1 with a reservoir of phase-change material enables simple fabrication and assembly at relatively low cost. Moreover, the phase-change material is directly in contact with the circulation plate 3, which facilitates and improves the exchanges of heat energy between the first heat-transfer fluid and the phase-change material.

The invention claimed is:

1. A tube with a reservoir of phase-change material for a heat exchange bundle of a heat exchanger, said tube with the reservoir of phase-change material comprising:
   two flow plates configured to be assembled with one another in fluid-tight fashion and form at least one duct in which a first heat-transfer fluid flows between said two flow plates; and
   at least one reservoir plate including a plurality of cavities of dome shape, said reservoir plate being configured to be assembled in fluid-tight fashion on an external face of one of the two flow plates to close the plurality of cavities and form housings for the phase-change material, said plurality of dome-shaped cavities projecting from the external face of the reservoir plate to allow a second heat-transfer fluid circulate between said plurality of cavities,
   wherein the plurality of cavities projecting from the external face of the reservoir plate have flat tops in order to come into contact with a second exchange tube in the heat exchange bundle, and
   wherein the two flow plates are identical and at least one of the two flow plates includes hollows for storing the phase-change material.

2. The phase-change material reservoir tube as claimed in claim 1, wherein the at least one reservoir plate comprises a single reservoir plate on one of the external faces, the single reservoir plate being in contact with the second heat-transfer fluid.

3. The phase-change material reservoir tube as claimed in claim 1, wherein the at least one reservoir plate comprises two reservoir plates with the reservoir of phase-change material on the external faces, the two reservoir plates being in contact with the second heat-transfer fluid.

4. The phase-change material reservoir tube as claimed in claim 3, wherein said tube with the reservoir of phase-change material includes a common orifice for filling the cavities of the two reservoir plates.

5. The phase-change material reservoir tube as claimed in claim 1, wherein the cavities have a "V" distribution about the longitudinal axis of the reservoir plate.

6. The phase-change material reservoir tube as claimed in claim 1, wherein each hollow is in contact with the other flow plate.

7. The phase-change material reservoir tube as claimed in claim 1, wherein the hollows are arranged in a quincunx.

8. A heat exchange bundle for a heat exchanger, comprising:
   a tube with a reservoir of phase-change material for a heat exchange bundle of a heat exchanger, said tube with the reservoir of phase-change material comprising:
      two flow plates configured to be assembled with one another in fluid-tight fashion and form at least one duct in which a first heat-transfer fluid flows between said two flow plates; and
      at least one reservoir plate including a plurality of cavities of dome shape, said reservoir plate being configured to be assembled in fluid-tight fashion on an external face of one of the two flow plates to close the plurality of cavities and form housings for the phase-change material, said plurality of dome-shaped cavities projecting from the external face of the reservoir plate to allow a second heat-transfer fluid circulate between said plurality of cavities,
      wherein the plurality of cavities projecting from the external face of the reservoir plate comprise flat tops in order to come into contact with a second exchange tube in the heat exchange bundle, and
      wherein the two flow plates are identical and at least one of the two flow plates includes hollows for storing the phase-change material.

9. A heat exchanger comprising:
   at least one heat exchange bundle comprising a tube with a reservoir of phase-change material for a heat exchange bundle of a heat exchanger, said tube with the reservoir of phase-change material comprising:
      two flow plates configured to be assembled with one another in fluid-tight fashion and form at least one duct in which a first heat-transfer fluid flows between said two flow plates; and
      at least one reservoir plate including a plurality of cavities of dome shape, said reservoir plate being configured to be assembled in fluid-tight fashion on an external face of one of the two flow plates to close the plurality of cavities and form housings for the phase-change material, said plurality of cavities projecting from the external face of the reservoir plate to allow a second heat-transfer fluid circulate between said plurality of cavities,
      wherein the plurality of cavities projecting from the external face of the reservoir plate comprise flat tops in order to come into contact with a second exchange tube in the heat exchange bundle, and
      wherein the two flow plates are identical and at least one of the two flow plates includes hollows for storing the phase-change material.

* * * * *